United States Patent [19]
Ferrigno et al.

[11] Patent Number: 5,569,546
[45] Date of Patent: Oct. 29, 1996

[54] REPAIRED ARTICLE AND MATERIAL AND METHOD FOR MAKING

[75] Inventors: Stephen J. Ferrigno, Cincinnati; David C. Fairbourn, Fairfield, both of Ohio

[73] Assignee: General Electric Company, Cincinnati, Ohio

[21] Appl. No.: 402,418

[22] Filed: Mar. 10, 1995

[51] Int. Cl.$^6$ .............. B23P 6/04; C22C 19/05; B23K 35/40; B23K 35/30

[52] U.S. Cl. .............. 428/668; 219/146.23; 219/146.41; 29/889.1; 416/241 R; 75/246

[58] Field of Search ............... 428/668; 75/246; 219/146.23, 146.41; 29/889.1; 416/241 R

[56] References Cited

U.S. PATENT DOCUMENTS

| | | | |
|---|---|---|---|
| 4,878,953 | 11/1989 | Saltzman et al. | 148/4 |
| 5,156,321 | 10/1992 | Liburdi et al. | 29/889.1 |

*Primary Examiner*—John Zimmerman
*Attorney, Agent, or Firm*—Andrew C. Hess; David L. Narciso

[57] ABSTRACT

A composite weld wire, for use in repairing an article of a Co base alloy, comprises the sintered product of a mixture, by weight, of about 50–90% of the Co base alloy and about 10–50% of a Ni base alloy consisting essentially of, by weight, about: 1.5–2.5% B, 2–5% Al, 2–4% Ta, 14–17% Cr, 8–12% Co, with the balance Ni and incidental impurities. Conveniently, the alloys initially are in powder form. A repaired Co base alloy article including a surface discontinuity, such as a crack or void, comprises a welded repair at the discontinuity using the weld wire. In another form, the article includes a first diffusion bonded repair alloy at the discontinuity and a second repair alloy welded over the first repair alloy using the composite weld wire. One form of a method for repairing the article includes first removing oxides from the discontinuity, diffusion bonding the first repair alloy at the discontinuity, and then welding the second repair alloy over the first repair alloy using the composite weld wire. In another form of the method, the repair alloy is welded directly over the discontinuity, particularly in the vicinity of a hole through a surface of the article. The total mount of B in the weld wire, or weld repair alloy, is in the range of about 0.2–1.2 weight % to provide desired weld flow without resulting in reduction in ductility and mechanical properties.

16 Claims, No Drawings

REPAIRED ARTICLE AND MATERIAL AND METHOD FOR MAKING

FIELD OF THE INVENTION

This invention relates to the repair of metal alloy articles and, more particularly, to a repaired article, a repair material in the form of a weld wire and to a method of repair of a Co base alloy article.

BACKGROUND OF THE INVENTION

In the repair of gas turbine engine high temperature operating components, such as high pressure turbine vanes which have been operated at high temperatures in an engine, it has been a practice first to clean the component to remove surface contaminants such as oxides at or within a surface discontinuity such as a crack, crevice, surface abrasion or wear area, etc. One commonly used cleaning method sometimes is referred to as Activated Diffusion Healing (ADH) and generally is described in U.S. Pat. No. 4,098,450— Keller et al, patented Jul. 4, 1978, the disclosure of which hereby is incorporated herein by reference. In that method, the component's surface discontinuity, such as a crack, is exposed to fluoride ions which convert oxides present to a gas which then leaves the surface portion to be repaired. In this way, the surface portion is cleaned and prepared for repair.

Repair of a Co base superalloy turbine vane made of an alloy sometimes referred to as X-40 alloy has included the above described fluoride ion cleaning method followed by a vacuum heat treatment, repair alloy application to the cleaned surface portion, and a diffusion heat treatment. The composition of the X-40 alloy includes, by weight, about: 0.45–0.55% C, 24.5–26.5% Cr, 7–8% W, 9.5–11.5% Ni, with the balance Co and incidental impurities, such as Mn, Si, S, and Fe at levels which do not adversely affect the function of the alloy. It has been observed that sometimes cracks can occur in a part of the component, such as the outer band carrying the vanes or in the vane itself or both, after such repair procedure. Application of a second round of the ADH process to repair the crack can add as much as a week or more to the repair cycle of a component, thereby dramatically increasing repair costs. On the other hand, welding can be accomplished in a few hours. Therefore, because X-40 alloy has been considered in the past to be a readily weldable alloy, cracks in the component, such as the outer band, have been repaired by welding with a welding wire made of one of a number of alloys. One frequently used welding wire is made from an alloy sometimes referred to as L-605 alloy and consisting nominally, by weight, of about: 10% Ni, 3% Fe, 20% Cr, 1% Si, 15% W, 1.5% Mn, with the balance Co and incidental impurities. A repetitive weld cycle sometimes is entered into in which the welding leads to additional cracking. Occasionally, the component being repaired is so distorted by welding that it must be scrapped. Also, when the component includes a cooling hole through a surface of the article and a discontinuity such as a crack exists in the hole's vicinity, such as at or near such hole, welding to repair the crack can be difficult in such vicinity, occasionally generating additional cracks.

SUMMARY OF THE INVENTION

The present invention, in one form, provides a composite weld wire for use in the repair of an article made of a Co base alloy. The wire is the sintered product of a mixture of about 50–90 wt. % of the Co base alloy, and about 10–50 wt. % of a Ni base alloy consisting essentially of, by weight, about: 1.5–2.5% B, 2–5% Al, 2–4% Ta, 14–17% Cr, 8–12% Co, with the balance Ni and incidental impurities. A preferred form of the Ni base alloy consists essentially of, by weight, about: 2.1–2.5% B, 3.2 –3.7% Al, 3.0–3.8% Ta, 14.8–15.8% Cr, 9.5–11% Co, with the balance Ni and incidental impurities. Conveniently, in one form, alloy powders are used. As used herein, the term "sintered product" is intended to include within its meaning a mechanical or metallurgical bonding, fusing, joining, etc of the alloys to provide an integral weld wire which is a composite of the alloys, even though porosity may be included within the wire structure. Examples of such a wire include, but are not limited to, a sintered wire, and an extruded wire.

Another form of the invention provides a repaired Co base alloy article, including a discontinuity in an article surface portion, comprising a first repair alloy diffusion bonded with the surface portion in the area of the discontinuity, and a second repair alloy welded over the first, diffusion bonded repair alloy, the second repair alloy comprising the welded product of about 50–90 wt. % of the Co base alloy article, and about 10–50 wt. % of a Ni base alloy consisting essentially of, by weight, about: 1.5–2.5% B, 2–5% Al, 2–4% Ta, 14–17% Cr, 8–12% Co, with the balance Ni and incidental impurities.

A further form of the present invention provides a repaired Co base alloy article including at least one hole, such as a cooling hole, through an article surface, and a discontinuity such as a crack in the article surface in the vicinity of the hole. The article includes a repair alloy welded to the surface at the discontinuity, the repair alloy comprising the welded product of a mixture comprising about 50–90 wt. % of the Co base alloy, and about 10–50 wt. % of a Ni base alloy consisting essentially of, by weight, about: 1.5–2.5% B, 2–5% Al, 2–4% Ta, 14–17% Cr, 8–12% Co, with the balance Ni and incidental impurities.

Still another form of the present invention provides a method for repairing a Co base alloy article at a surface portion discontinuity including the steps of first removing oxides from the discontinuity, vacuum diffusion bonding a first repair alloy at the discontinuity, preparing a composite weld wire which is the sintered product of about 50–90 wt. % of the Co base alloy, and about 10–50 wt. % of a Ni base alloy consisting essentially of, by weight, 1.5–2.5% B, 2–5 % Al, 2–4% Ta, 14–17% Cr, 8–12% Co, with the balance Ni and incidental impurities, and welding a second repair alloy over the first repair alloy using the composite weld wire. The total amount of B in the weld wire, or weld repair alloy, is in the range of about 0.2–1.2 weight % to provide desireed weld flow without resulting in reduction in ductility and mechanical properties.

DESCRIPTION OF THE PREFERRED EMBODIMENTS

The Ni base alloy, conveniently used in powder form, which forms a significant part of the present invention, generally described above, sometimes is referred to as D-15 alloy and has the composition range, by weight, of about: 1.5–2.5% B, 2–5% Al, 2–4% Ta, 14–17% Cr, 8–12% Co, with the balance Ni and incidental impurities. This alloy is more fully described in U.S. Pat. No. 3,759, 692 —Zelahy, patented Sep. 18, 1973, the disclosure of which hereby is incorporated herein by reference. In the ADH repair of articles, such as gas turbine engine turbine vanes of the above identified X-40 alloy, it has been a practice to use as a vacuum diffusion bonding alloy a powder mixture of about 50 wt. % X-40 alloy and about 50 wt. % of a form of D-15 alloy consisting essentially of, by weight, about: 2.1–2.5% B, 3.2–3.7% Al, 3.0–3.8% Ta, 14.8–15.8% Cr, 9.5–11% Co, with the balance Ni and incidental impurities. The mixture is disposed over a surface connected discontinuity. Then when a subsequent weld repair was indicated after processing by the ADH process, a weld wire of the above identified L-605 alloy was used. To overcome the article cracking and distortion problems described above, the present invention was evaluated in a variety of tests.

Using X-40 alloy as an example of the Co base alloy substrate material from which an article is made, it was recognized that the combination of a powder of X-40 alloy and a powder of D-15 alloy, within the composition range of the present invention, is very close to the chemical composition of the X-40 substrate material. As was mentioned above, L-650 Co base alloy weld wire was used in the repair, after ADH processing, of the component, such as the outer band area of an X-40 alloy turbine vane. It is believed that the additional cracking during welding that occurs occasionally is due, at least in part, to the fact that L-605 alloy does not include the element boron which can assist in lowering the flow temperature of the repair alloy and can reduce the heat input to the substrate being treated. Also, unlike X-40 alloy, L-605 alloy does include a small amount of Fe ( for example about 3 wt. % ) which generally is considered to be undesirable in alloys used to manufacture high pressure turbine components. Boron is a eutectic depressant not present in L-605 alloy. However, it also was recognized, during evaluation of this invention, that too much boron in the repair alloy can embrittle the resulting repair. For example, D-15 alloy, which forms an integral part of a form of this invention, includes B in the range of about 1.5–2.5 wt. %, and preferably about 2.1–2.5 wt. %. It is believed that inclusion of B in the powder mixture associated with this invention at total levels greater than about 1.2 wt. %, representing a mixture including about 50 wt. % D-15 alloy, tends to lower ductility and decrease mechanical properties of the resulting repair. Total levels of B less than about 0.2 wt. %, representing a mixture including less than about 10 wt. % D-15 alloy, includes insufficient B to promote desired weld material flow. Therefore, the present invention includes the above defined D-15 alloy in the range of about 10–50 wt. % in a powder mixture with about 50–90 wt. % of a powder of a Co base alloy substrate being repaired. Using X-40 alloy as the substrate alloy in the evaluation of this invention, it is preferred that, in order to maintain the repair composition close to that of the substrate, a mixture of about 10 wt. % D-15 alloy powder and about 90 wt. % X-40 alloy powder specifically is preferred.

A variety of tests using a composite weld wire of that composition resulted in successful repairs without cracking resulting from welding. The weld wire associated with the present invention was made from a powder mixture by a typical, widely known sintering operation involving a ceramic tube in which the powder mixture is placed. In one example, first the powder mixture was made by mechanically blending 10 wt. % of the above identified D-15 alloy powder (including, nominally by weight, about: 2.3% B, 3.5% Al, 3.4% Ta, 15.3% Cr, 10.3% Co, with the balance Ni and incidental impurities) with 90 wt % of the above identified X-40 alloy (including, nominally by weight, about: 0.5% C, 25.5% Cr, 7.5% W, 10.5% Ni, with the balance Co and incidental impurities). Using an 18" long aluminum oxide ceramic thermocouple tube with a 0.060" bore, one end was plugged at the dp with a Fiberfrax material and the end then dipped in a stop-off material. The tube then was fitted to the top through the open end with the above preferred, powder mixture in the size range of about 120/+325 mesh, and that end was plugged with Fiberfrax material to which stop-off material was applied. The filled ceramic tubes were positioned at an angle of about 45° in a vacuum furnace and heated for sintering at a temperature in the range of about 2100–2200° F. for about 1 hour in a vacuum of about 0.5 micron through the sintering process. The tubes then were cooled to about 600° F. and removed from the furnace. The sintered, composite weld wire of the present invention was removed from the ceramic tube by tapping the ceramic tube lightly with a hammer while the tube was on a metal plate. These wires were then used in the evaluation of the present invention.

In one example, after the above described ADH repair of a crack in an X-40 alloy high pressure turbine vane using a powder mixture of about 50 wt. % X-40 alloy powder and about 50 wt. % D-15 alloy powder for the vacuum diffusion process, a crack was observed in the area of the ADH process repair. In another example, voids in the ADH repair were observed during fluorescent penerrant inspection. The weld wire of the present invention, as prepared above, then was used successfully without subsequent cracking or distortion, to weld such additional crack, or repair such voids, observed after ADH repair. Therefore, one form of the present invention provides a repaired Co base alloy article including a first vacuum diffusion bonded repair alloy at a surface connected discontinuity, such as a crack or void, and a second repair alloy, within the composition scope of the weld wire of the present invention, welded over the first repair alloy.

In another example, a crack was observed in the vane surface in the vicinity of a cooling hole through the vane surface. The weld wire of the present invention, as prepared above, was used successfully to repair such crack directly, without first using the ADH process.

The present invention has been described in connection with specific examples and embodiments. However, it should be understood that these are presented as typical of rather than in any way limiting on the scope of the invention. Those skilled in the metallurgical art will recognize that the present invention is capable of other variations and modifications within its scope as defined in the appended claims.

We claim:

1. A composite weld wire for use with an article made of a Co base alloy, the wire comprising the sintered product of a mixture of:

about 50–90 weight % of the Co base alloy; and, about 10–50 weight % of a Ni base alloy consisting essentially of, by weight, about:

1.5–2.5 % B,

2–5% Al,

2–4% Ta,

14–17% Cr,

8–12% Co, with the balance Ni and incidental impurities;

the total amount of B. in the weld wire being in the range of about 0.2–1.2 weight %.

2. The weld wire of claim 1 in which the Ni base alloy consists essentially of, by weight, about: 2.1–2.5% B, 3.2–3.7% Al, 3.0–3.8% Ta, 14.8–15.8% Cr, 9.5–11% Co, with the balance Ni and incidental impurities.

3. The weld wire of claim 1 in which the Co base alloy consists essentially of, by weight, about:

0.45–0. 55% C, 24.5–26.5% Cr,

7–8% W, 9.5–11.5% Ni, with the balance Co and incidental impurities.

4. The weld wire of claim 3 comprising the sintered product of:

about 90 weight % of a Co base alloy powder consisting nominally, by weight, about 0.5% C, 25.5% Cr, 7.5% W, 10.5% Ni, with the balance Co and incidental impurities; and, about 10 weight % of a Ni base alloy powder consisting nominally, by weight, about 2.3% B, 3.5% Al, 3.4% Ta, 15.3% Cr, 10.3% Co, with the balance Ni and incidental impurities.

5. A repaired article of a Co base alloy and including a discontinuity in an article surface, the article having welded at the discontinuity a repair alloy comprising the welded product of a mixture comprising:

about 50–90 weight % of the Co base alloy; and, about 10–50 weight % of a Ni base alloy consisting essentially of, by weight, about: 1.5–2.5 % B, 2–5 % Al, 2–4 % Ta, 14–17 % Cr, 8–12 % Co, with the balance Ni and incidental impurities, the total amount B in the repair alloy being in the range of about 0,2–1.2 weight %.

6. The repaired article of claim 5 in which there is included at the discontinuity:

a first repair alloy diffusion bonded with the discontinuity; and a second repair alloy welded over the first repair alloy, the second repair alloy comprising the welded product of a mixture comprising:

about 50–90 weight % of the Co base alloy; and, about 10–50 weight % of a Ni base alloy consisting essentially of, by weight, about: 1.5–2.5% B, 2–5% Al, 2–4% Ta, 14 17% Cr, 8–12% Co, with the balance Ni and incidental impurities.

7. The article of claim 6 in which the Ni base alloy consists essentially of, by weight, about: 2.1–2.5% B, 3.2–3.7% Al, 3.0–3.8% Ta, 14.8–15.8% Cr, 9.5–11% Co, with the balance Ni and incidental impurities.

8. The repaired article of claim 7 in which the first repair alloy comprises the diffusion product of a powder mixture of a powder of the Co base alloy and a powder of a Ni base alloy consisting essentially of, by weight, 2.1–2.5% B, 3.2–3.7% Al, 3.0–3.8% Ta, 14.8–15.8% Cr, 9.5–11% Co, with the balance Ni and incidental impurities.

9. The repaired article of claim 8 in which:

the Co base alloy in both the first and the second repair alloys consists essentially of, by weight, about: 0.45–0.55% C, 24.5–26.5% Cr, 7–8% W, 9.5–11.5% Ni, with the balance Ni and incidental impurities;

the first repair alloy comprises, by weight, a mixture of about 50 of the Co base alloy powder and about 50% of the Ni base alloy powder; and, the second repair alloy comprises, by weight, a mixture of about 90% of the Co base alloy and about 10% of the Ni base alloy.

10. The repaired article of claim 5 including at least one hole through an article surface and a discontinuity in the article surface in the vicinity of the hole, the article including the repair alloy welded to the article surface at the discontinuity in the vicinity of the hole.

11. The repaired article of claim 10 in which the Ni base alloy consists essentially of, by weight, about: 2.1–2.5% B, 3.2–3.7% Al, 3.0–3.8% Ta, 14.8–15.8% Cr, 9.5–11% Co, with the balance Ni and incidental impurities.

12. In a method for repairing an article of a Co base alloy at a surface discontinuity, wherein oxides are removed from the discontinuity and weld wire is used to provide a weld over the discontinuity, the improvement wherein:

the weld wire is a composite weld wire of a repair alloy which is the sintered product of a mixture of:

about 50–90 weight % of the Co base alloy; and, about 10–50 weight % of a Ni base alloy consisting essentially of, by weight, about: 1.5–2.5 % B, 2–5 % Al, 2–4 % Ta, 14–17 % Cr, 8–12% Co, with the balance Ni and incidental impurities, the total of amount of B in the weld wire being in the range of about 0.2–1.2 weight %: and, welding the repair alloy over the discontinuity using the composite weld wire.

13. The method of claim 12 including the steps of:

removing oxides from the discontinuity;

placing over the discontinuity a first repair alloy powder comprising a powder mixture of a powder of the Co base alloy and a powder of a Ni base alloy consisting essentially of, by weight, about: 1.5–2.5% B, 2–5% Al, 2–4% Ta, 14–17% Cr, 8–12% Co, with the balance Ni and incidental impurities;

vacuum diffusion bonding the first repair alloy powder at the discontinuity to provide a first repair;

providing the composite weld wire as a second repair alloy; and, welding the second repair alloy over the first repair using the composite weld wire.

14. The method of claim 13 in which the Co base alloy consists essentially of, by weight, about: 0.45–0.55% C, 24.5–26.5% Cr, 7–8% W, 9.5–11.5% Ni, with the balance Co and incidental impurities.

15. The method of claim 14 in which:

the first repair alloy comprises, by weight, a mixture of about 50% of a powder of the Co base alloy, and about 50% of a powder of the Ni base alloy; and, the weld wire comprises the sintered product of a powder mixture, by weight, of about 90% of a powder of the Co base alloy, and about 10% of a powder of the Ni base alloy.

16. The method of claim 12 for repairing a Co base alloy article including at least one hole through an article surface and a discontinuity fitrough the article surface in the vicinity of the hole, wherein the Ni base alloy in the composite weld wire consists essentially of, by weight, 2.1–2.5% B, 3.2–3.7% Al, 3.0–3.8% Ta, 14.8–15.8% Cr, 9.5–11% Co, with the balance Ni and incidental impurities.

* * * * *